(12) United States Patent
Roggendorf et al.

(10) Patent No.: US 10,696,183 B2
(45) Date of Patent: Jun. 30, 2020

(54) TRANSFORMER APPARATUS FOR A CHARGING STATION FOR ELECTRICALLY CHARGING VEHICLES AND HAVING AT LEAST TWO CHARGING POINTS

(71) Applicant: Dr. Ing. h.c. F. Porsche Aktiengesellschaft, Stuttgart (DE)

(72) Inventors: Christoph Roggendorf, Markgröningen (DE); Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 4 days.

(21) Appl. No.: 16/181,756

(22) Filed: Nov. 6, 2018

(65) Prior Publication Data

US 2019/0184839 A1     Jun. 20, 2019

(30) Foreign Application Priority Data

Dec. 19, 2017   (DE) .................. 10 2017 130 474

(51) Int. Cl.
   *B60L 53/30*     (2019.01)
   *H01F 30/04*    (2006.01)
   (Continued)

(52) U.S. Cl.
   CPC .............. *B60L 53/30* (2019.02); *B60L 53/11* (2019.02); *H01F 29/02* (2013.01); *H01F 30/04* (2013.01); *H01H 9/0005* (2013.01)

(58) Field of Classification Search
   CPC .......... B60L 53/30; B60L 53/11; H01F 29/02; H01F 30/04; H01H 9/0005
   (Continued)

(56) References Cited

U.S. PATENT DOCUMENTS 4,788,634 A  *  11/1988  Schlecht  ........... H02M 3/33538
                                                          323/266
5,200,645 A  *   4/1993  Laeuffer  .................. H05G 1/10
                                                          307/82
(Continued)

FOREIGN PATENT DOCUMENTS

CN           105141019 A      12/2015
DE        102012212291 A1      2/2014
(Continued)

OTHER PUBLICATIONS

German Examination Report for German Application No. 10 2017 130 474.6, dated Sep. 7, 2018, with partial translation—8 pages.

(Continued)

*Primary Examiner* — M Baye Diao
(74) *Attorney, Agent, or Firm* — RatnerPrestia

(57) ABSTRACT

A transformer apparatus for a charging station for electrically charging vehicles. The charging station includes at least two charging points. The transformer apparatus includes an input connection for electrical connection to an electrical power source. The transformer apparatus further includes at least one primary winding, and connected downstream electrically in series, at least three electrically parallel secondary windings that are DC-isolated from one another. The secondary windings are configured to be connected to at least two output connections of the at least two charging points of the charging station by switching logic. The switching logic connects at least two secondary windings electrically in parallel with a respective output connection of a respective charging point.

13 Claims, 3 Drawing Sheets

(51) Int. Cl.
*H01F 29/02* (2006.01)
*B60L 53/10* (2019.01)
*H01H 9/00* (2006.01)

(58) Field of Classification Search
USPC .......................................................... 320/109
See application file for complete search history.

(56) References Cited

U.S. PATENT DOCUMENTS

| | | | | |
|---|---|---|---|---|
| 6,061,257 | A * | 5/2000 | Spampinato | H02M 1/32 363/21.13 |
| 8,436,602 | B2 * | 5/2013 | Sykes | H02M 5/12 323/258 |
| 10,014,720 | B2 * | 7/2018 | Ichikawa | H02J 50/12 |
| 10,081,265 | B2 | 9/2018 | Oestreicher et al. | |
| 2010/0183095 | A1 * | 7/2010 | Lindenmeier | H04B 7/0808 375/324 |
| 2013/0020989 | A1 | 1/2013 | Xia et al. | |
| 2015/0165917 | A1 | 6/2015 | Robers et al. | |
| 2016/0137076 | A1 * | 5/2016 | King | B60L 58/12 320/108 |
| 2016/0375781 | A1 | 12/2016 | Herke et al. | |
| 2017/0240063 | A1 | 8/2017 | Herke et al. | |
| 2018/0162229 | A1 | 6/2018 | Götz et al. | |

FOREIGN PATENT DOCUMENTS

| | | |
|---|---|---|
| DE | 102015110023 A1 | 12/2016 |
| DE | 102016102053 A1 | 8/2017 |
| DE | 102016103011 A1 | 8/2017 |
| DE | 102016123924 A1 | 6/2018 |
| EP | 2665152 A2 | 11/2013 |
| EP | 3333005 A1 | 6/2018 |
| JP | 2015507914 A | 3/2015 |
| WO | 2017165573 A1 | 9/2017 |

OTHER PUBLICATIONS

Japanese Office Action for Japanese Application No. 2018-235251, dated Jun. 12, 2019—4 pages.
Japanese Decision of Refusal for Japanese Application No. 2018-235251, dated Jan. 15, 2020, 4 pages.

* cited by examiner

TRANSFORMER APPARATUS FOR A CHARGING STATION FOR ELECTRICALLY CHARGING VEHICLES AND HAVING AT LEAST TWO CHARGING POINTS

CROSS-REFERENCE TO RELATED APPLICATION

This application claims priority to German Patent Application No. DE 10 2017 130 474.6, filed Dec. 19, 2017, the entire disclosure of which is incorporated by reference herein in its entirety.

FIELD OF THE INVENTION

The present invention relates to a transformer apparatus for a charging station for electrically charging vehicles and having at least two charging points.

BACKGROUND OF THE INVENTION

It is known that charging stations for electrically driven vehicles are provided with two or more charging points. In this case, two or more vehicles can be charged at the same time at said individual charging points. The transformer apparatus serves here firstly to distribute power to the individual charging points.

Modern electric vehicles generally allow two charging modes. A vehicle has an on-board charging device for charging at a conventional AC voltage or three-phase connection, said charging device both performing the required conversion to direct current and controlling the respective charging operation. However, this AC charging mode is extremely restricted in terms of charging speed on account of the connection power available, which is generally not more than 16 A or 32 A, and on account of the installation of the charging device with sufficient power. In modern electric vehicles, this results in charging times of several hours every 100 km. Rapid DC charging, preferably using DC voltage, has been developed on account on the high charging times for AC charging. In contrast to AC charging, the electrical operating means and components required for charging to this end are not carried concomitantly in the vehicle but are provided by a charging column outside of the vehicle. The charging column performs the charging process and thus forms voltage and current on demand of the vehicle, as is necessary for charging the respective vehicle battery. Correspondingly provided DC charging lines are electrically connected to the poles of the high-voltage battery of the vehicle by various contactors in the vehicle during the charging process. The powers of conventional DC charging stations are currently typically up to 50 kW and are generally drawn directly from the low-voltage grid or local grid. However, charging powers of more than 300 kW would be desirable in order to surpass charging speeds of more than 20 km/min. Furthermore, charging voltages of up to 1000 V are sought in order to charge batteries of future vehicles with 600 V or even above 800 V battery voltage and to achieve higher charging powers with low charging currents. Exemplary details regarding DC charging are described, inter alia, in IEC 61851, which is incorporated by reference herein. To charge vehicles with more than 300 kW power, drawing the energy from the low-voltage grid or local grid is not conducive to grid stability and the connection to the medium-voltage distribution grid or in future even the high-voltage grid offers significant advantages.

Patent application DE 10 2012 212 291, which is incorporated by reference herein, describes a system for electrical DC-voltage charging, which system has at least one DC/DC regulator module comprising a DC/DC step-down module without DC isolation and a DC/DC resonant converter module with DC isolation.

Patent applications DE 10 2015 110 023, which is incorporated by reference herein, and DE 10 2016 123 924, which is incorporated by reference herein, describe apparatuses for DC-voltage charging of electric vehicles, which apparatuses operate in technical circles under the name "split powerline." In this case, the desired DC isolation of the individual charging connections or charging points of a charging park from the energy grid and from one another is achieved by a transformer having separate secondary windings. The advantage of this technology lies in the possible use of non-DC-isolating operating means, which are cost-effective and expedient in terms of installation space, such as, for example, rectifiers, AC/DC converters and DC/DC converters subsequent to the respective secondary windings. The mentioned transformer can in this case be fed from a low, medium or high voltage using appropriate coil ratios. In this technology, the transformer provides, on the one hand, the energy for the charging points, as well as the DC isolation. The alternating current of the secondary windings of the transformer is in this case generally converted to a direct current by a rectifier or an AC/DC converter, which direct current can also optionally be adapted in terms of the voltage and can be further modeled in terms of its physical properties, for example the current ripple, by a downstream DC/DC converter. The DC-voltage output can be fed to a vehicle via a charging cable. The secondary windings can in each case be single-phase or polyphase windings.

A disadvantage of the known solutions and, in particular, of split powerline technology is that the number of charging points at a charging station for an individual transformer apparatus leads to a significant increase in complexity, physical size and costs. According to the prior art, transformers generally have to be developed in an application-specific manner and adapted for each charging park and also load scenarios of the individual charging points. Furthermore, in particular, an asymmetrical charging situation or an asymmetrical construction situation of different charging functions, different charging powers or different charging points has to be taken into account in the transformer apparatus. In this case, it should be pointed out, in particular, that different charging points can be, or even in some charging situations have to be, supplied with different electrical powers. This can be done, inter alia, in a flexible manner too when, for example, different vehicles at two charging points require different electrical charging powers. However, it is also conceivable for the transformer apparatus to have to supply different charging points with always a different electrical power in a structurally fixed manner. In both cases, the known transformer apparatuses are only insufficiently designed for this flexibility. Said flexibility therefore has to be taken into account in the construction from the outset and provided with appropriate large, complex and expensive construction technology in the transformer apparatus.

SUMMARY OF THE INVENTION

Some examples described herein can at least partially eliminate the disadvantages described above. For example, to increase the flexibility during use for a transformer apparatus, a transformer apparatus for split powerline systems can be utilized, in a cost-effective and simple manner.

Some examples include a transformer apparatus, a charging station, and a method. Further features and details of will emerge from the description and the drawings. Features and details which are described in conjunction with the transformer apparatus according to aspects of the invention also apply, of course, in conjunction with the charging station according to aspects of the invention and in conjunction with the method according to aspects of the invention and vice versa in each case, and therefore reference is or can be made constantly from one to the other in respect of the disclosure of the individual aspects of the invention.

According to aspects of the invention, switching logic denotes fixed electrical wiring, for example, with screw connections, clamping connections, welded connections or soldered connections or configurable electrical circuitry with electrical switches, electrical plug connectors or the like.

The invention proposes a transformer apparatus for a charging station for electrically charging vehicles and having at least two charging points. Said transformer apparatus has an input connection for electrical connection to an electrical power source. Furthermore, at least one primary winding and at least three secondary windings that are DC-isolated from one another are provided. The secondary windings are connected to at least two output connections of the at least two charging points by switching logic. The switching logic connects at least two secondary windings electrically in parallel with an output connection of a charging point so that the two secondary windings jointly provide the load current and hence the charging power of one charging point. A transformer apparatus of this kind can be understood to be a reconfigurable transformer. In this case, a plurality of secondary windings with lower power can be used, which windings can be configured during assembly by clamps, screw terminals or the like. Two secondary windings can also be connected in parallel to one connection.

The secondary windings can in each case be single-phase or polyphase windings. In this case, particularly three-phase windings, which can be embodied, for example, in a star or delta configuration, are advantageous in currently conventional three-phase energy systems. A combination of star and delta configuration can likewise be used in order to form at least one six-phase secondary winding. This provides the advantage that a rectifier that is connected thereto can be embodied in a twelve-pulse manner in order to generate a very low current ripple and very low grid perturbation. Furthermore, other numbers of phases in secondary windings can also be generated by what are known as zigzag windings.

According to aspects of the invention, the transformer apparatus is now divided into two essential electrical sections. On the one hand, this is the primary winding, which is provided as a common winding for all of the charging points. Power that is provided electrically from the electrical power source thus passes through said at least one primary winding in a first section. At least three secondary windings that are DC-isolated from one another and specific to the individual charging points are now magnetically coupled to the at least one primary winding. At least two of said at least three secondary windings are now electrically connected in parallel with a single and common output connection of a charging point with the aid of the switching logic. This therefore means that at least two secondary windings are electrically interconnected in parallel in order to supply power using at least two secondary windings to a single output connection of an individual charging point with the aid of the switching logic.

As can be taken from the above explanation, the complexity or the diversity of the individual charging points is now no longer provided in a constructive manner by secondary windings or primary windings in the transformer apparatus. Instead, the complexity and hence also the flexibility is configured by the switching logic in the transformer apparatus and can be provided, in particular, in details explained in more detail later, in a simple, cost-effective and, above all, reversible manner. The switching logic now permits connection of no longer just one individual secondary winding in an explicit and targeted manner to an individual charging point and an individual output connection. Instead, a combination of at least two or more secondary windings electrically in parallel by the switching logic is also possible in order to therefore be able to provide an increase in the electrical power and hence also an asymmetrical charging behavior between different output connections and hence also between different charging points, for example a dedicated high-power charging point and a charging point having a lower charging power.

In particular, when different powers are required at different charging points, two or more secondary windings, which have, for example, an identical or a similar individual power, can be combined with the aid of the switching logic. By electrically connecting the individual secondary windings in parallel, the sum of the total output power, which has now been provided at the output connection of the respective charging point in a combined manner by the switching logic, is therefore increased. The flexibility in the switching logic now leads to a transformer apparatus having fixed and constructively inbuilt secondary windings also being able to be adapted in a flexible manner to a wide variety of charging point situations or electrical charging situations.

In this case, in a manner according to aspects of the invention, a charging point is to be understood, in particular, as an electrical dispenser, that is to say, for example, an output connection in the form of a charging plug, which can be plugged into a charging socket of a vehicle that is to be electrically charged. The combination with the aid of the switching logic can in this case take place in both a reversible and irreversible manner. However, a reversible, in particular flexible, configuration of the switching logic is preferred, as will be explained in more detail later.

It is also advantageous when the switching logic in a transformer apparatus according to aspects of the invention has at least one combination circuit, which combines at least two secondary windings with one another onto an output connection. The switching logic therefore serves to provide the combination with a fixed combination circuit so that, in particular, a fixed or static electrical circuit is provided as the combination circuit in the switching logic. In this case, it can be both a reversible and irreversible or one-time setting that is involved. This is preferably understood to mean a manual setting in the device of the transformer apparatus or the switching logic.

It is also advantageous when said combination circuit in a transformer apparatus according to aspects of the invention is configured as a reversible combination circuit. In other words, during manufacture, the transformer apparatus can be configured with the switching logic in the form of at least one combination circuit. Said combination circuit can have, for example, plug contacts, clamping or screw contacts for the parallel connection of the individual secondary windings. The reversible combination circuit in the switching logic serves so that, in the mounting situation at the respective charging station, the technician is now able to adapt said reversible combination circuit to a wide variety of charging situations in a flexible and free manner. The reversible combination circuit can therefore simplify both the production due to a certain degree of standardization and the installation and start-up due to a corresponding adaptation capability. If the present transformer apparatus should be used now for three charging points, said reversibly designed combination circuit is accordingly manually adapted to interconnection of the secondary windings onto three output connections and accordingly onto three charging points. In contrast, if a higher number of charging points up to the number of secondary windings of the transformer is demanded, for example six charging points, the reversible combination circuit in the same transformer apparatus can be manually adapted so that the secondary windings can now actuate or connect six output connections and hence six charging points, for example, with the aid of a plug combiner. It may also be advantageous when the switching logic in a transformer apparatus according to aspects of the invention has a switching matrix for flexible combination of the secondary windings onto the output connections. Said switching matrix can be an alternative to the combination circuit, as has been explained in the preceding paragraphs. However, a combination of a fixed or reversible combination circuit on the one hand and a flexible combinable switching matrix on the other hand is also conceivable within the context of the present invention. It is preferred when the switching matrix can be actuated automatically or at least semi-automatically, as will be explained in more detail later with the monitoring unit and in connection with the method according to aspects of the invention. The switching matrix now permits flexible combination of the secondary windings so that adaptation can be effected not only to the generally constructive design of the respective charging station but rather asymmetrical charging situations can also be balanced through switching over the switching matrix in the switching logic. The flexibility during use for a transformer apparatus according to aspects of the invention therefore increases further. In this case, an exclusive actuation in the load-free, that is to say the virtually current-free, state can take place, as a result of which switching elements of the switching matrix must not be capable of isolating currents. However, a switching matrix of this kind can also be embodied for switching over under load using suitable switching elements. Said switching elements may be, on the one hand, mechanical switches, which are able to isolate electric arcs, have suitable extinguishing chambers, provide extinguishing apparatuses or act in a vacuum, or may be electronic switches, which comprise appropriate freewheeling circuits or snubber networks, in order to make it possible to disconnect the current. It is likewise possible to combine electronic switches with mechanical switches in such a way that the electronic switches perform the current disconnection and the mechanical switches provide only an isolation in the open state or the predominant conductive path in the closed state. In this case, the mechanical switches must not be capable of isolating the current. For example, electronic switches and mechanical switches can be configured electrically in parallel for this purpose. In the switched-on state, the mechanical switches conduct the main current while the electronic switches are preferably open. For disconnection, the electronic switches are switched on for the time being, then the mechanical switches are opened so that the current commutates fully onto the electronic switches, whereupon the electronic switches are opened in order to prevent the flow of current.

It is also advantageous when the switching matrix in a transformer apparatus according to aspects of the invention has a monitoring unit for monitoring the power consumption at the output connections and adapting the combination of the secondary windings based on said monitoring. The monitoring unit can have, for example, sensor means and monitoring means, which can perform automatic and/or reversible monitoring. For example, if the monitoring unit identifies an increased power consumption at an output connection at a corresponding charging point, the additional connection of a further or a plurality of further secondary windings the provided power at said output connection can be effected by flexible adaptation and now flexible switching combinatorics. In other words, an increased power demand or an increased power consumption, for example in the case of a particularly empty battery apparatus in the electric vehicle that is to be charged, is countered with an increase in the provided power at said charging point. The flexibility during use and, in particular, the most accurate possible distribution of the present electrical power at the input connection over the individual output connections can therefore be improved significantly. The comfort and above all also the charging speed for electrically charging the individual vehicles can therefore be increased significantly and hence the approval of the user of such a charging station can be improved. The ideal power that is actually also required at the respective charging point at the present time is therefore preferably always present at said charging point.

Furthermore, it is advantageous when the secondary windings in a transformer apparatus according to aspects of the invention are dimensioned for an identical or substantially identical power stage. Such a power stage can be, for example, 160 kVA. Segmentation into 160 kVA units has proven to be very advantageous for the high-power charging of electric vehicles. The individual secondary windings can be of modular design and can be combined in a simple manner in an axial or radial direction. The reduction to a single power stage leads during manufacture to the secondary windings being able to be prefabricated as base modules and, depending on the size of the transformer apparatus, being strung together in the axial direction in a simple manner. Transformer apparatuses of different sizes can therefore be provided in a modular manner simply and cost-effectively. The stringing together or the power interconnection now takes places over the smallest common multiple of said individual identical or substantially identical power stages so that a high degree of flexibility in the power interconnection can be provided by way of the switching logic.

It is also advantageous when the input connection in a transformer apparatus according to aspects of the invention is designed as a central connection plate. A central connection plate of this kind leads to a further reduction in the complexity and, in particular, to a further reduction in the production outlay, the costs and the installation space or the weight of a transformer apparatus of this kind.

The subject matter of the present invention is likewise a charging station for electrically charging vehicles, having at least two charging points and at least one transformer apparatus according to aspects of the invention. A charging station according to aspects of the invention therefore affords the same advantages as have been explained in detail with respect to a transformer apparatus according to aspects of the invention.

The subject matter of the present invention is likewise a method for adapting a transformer apparatus according to the present invention to a charging situation at a charging station according to the present invention, having the following step(s): connecting an output connection of a charging point electrically in parallel with at least two secondary windings by the switching logic. By applying a method to a charging station according to aspects of the invention or to a transformer apparatus according to aspects of the invention, the same advantages as have been explained in detail with respect to the charging station according to aspects of the invention and with respect to the transformer apparatus according to aspects of the invention are achieved.

A method according to aspects of the invention can be developed to the effect that the power consumption at the output connections is monitored by a monitoring unit and the combination of the secondary windings is adapted based on the monitoring result. The flexibility during use of the monitoring unit is therefore increased so that the transformer apparatus can also take into account different and, in particular, asymmetrical power consumption situations at the individual charging points.

BRIEF DESCRIPTION OF THE DRAWING

Further advantages, features and details of the invention emerge from the description 3 below in which exemplary embodiments of the invention are described in detail with reference to the drawings. The features mentioned here in the claims and in the description may be essential to the invention in each case individually by themselves or in any desired combination. Schematically in the drawings:

DETAILED DESCRIPTION OF THE INVENTION

Figure 1:
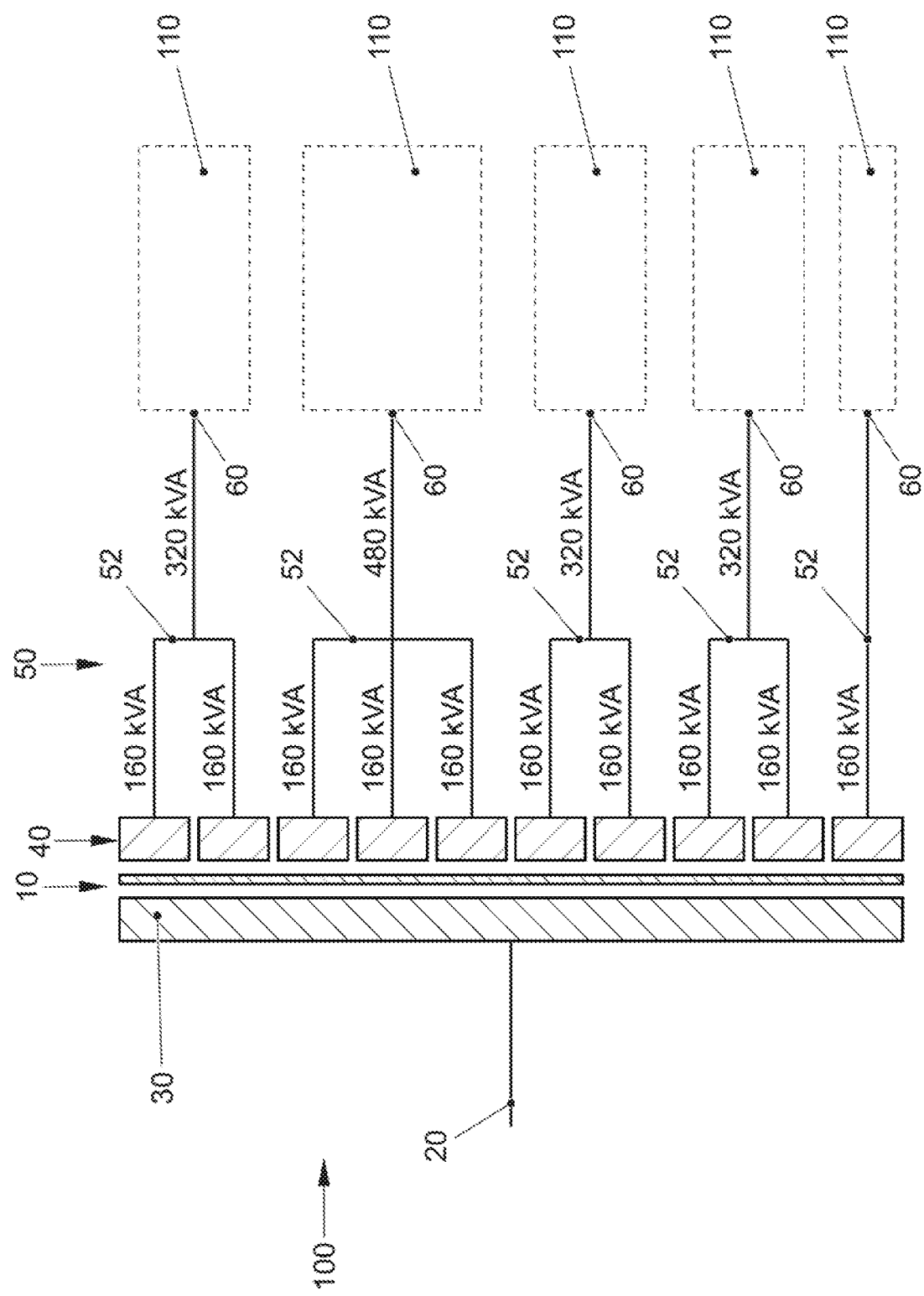
FIG. 1 shows an embodiment of a transformer apparatus according to aspects of the invention.

FIG. 1 schematically shows how an external electrical power source can supply electric current to a primary winding 30 by a common input connection 20. The charging station 100 is in this case fitted with a total of five charging points 110, which are supplied with electrical power for charging by in each case its own output connection 60 of the transformer apparatus 10.

A multiplicity of individual secondary windings 40 are wound over a common core of the transformer apparatus 10. The individual secondary windings 40 are all designed with an identical electrical power in the form of 160 kVA. However, in this case, switching logic 50 is provided, which combines the individual secondary windings 40 to one another in a different way. In this case, it is a reversible or manual combination circuit 52 that is involved. Said combination circuit 52 of the switching logic 50 is explained in more detail below.

In this embodiment, a combination of the individual secondary windings 40 is performed from top to bottom. The uppermost combination circuit 52 combines in this case two secondary windings 40 and hence doubles the power capability to 320 kVA at the uppermost output connection 60 of the uppermost charging point 110. The next charging point 110 and the associated output connection 60 combines three secondary windings 40 to form 480 kVA and hence the maximum power output within said charging station 100 of FIG. 1 with the aid of the combination circuit 52. The next two output connections 60 are in turn identical to the first output connection 60 and each combine two secondary windings 40 to form 320 kVA at the respective charging points 110. The lowermost charging point 110 and hence also the lowermost output connection 60 shows that a combination of a single secondary winding 40 and hence the simple provision of a charging unit for electrical charging at the output connection 60 is also possible. Virtually arbitrary electrical combinatorics of the secondary windings 40 can be realized as an essential characteristic of said embodiment of the invention.

Figure 2:
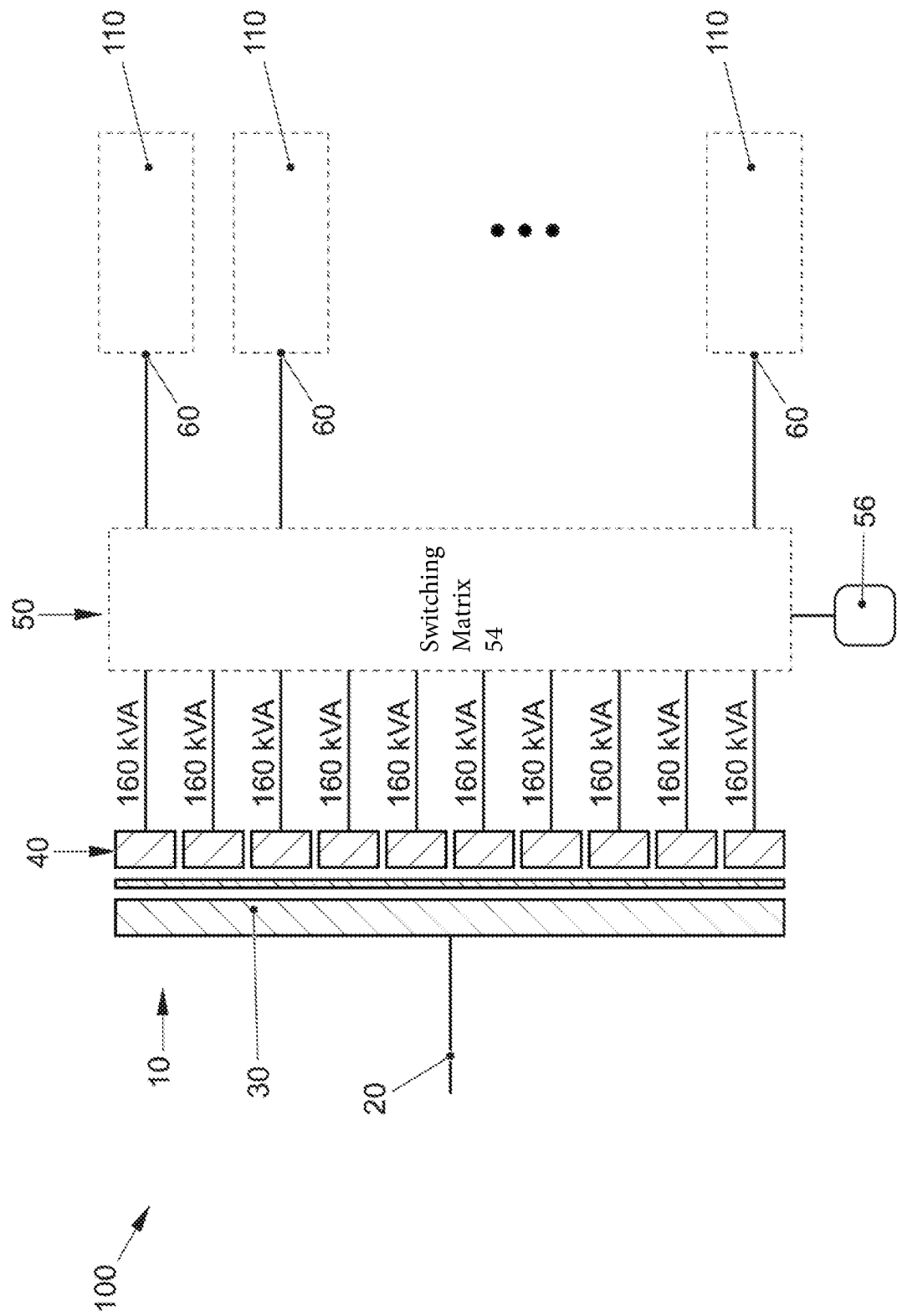
FIG. 2 shows a further embodiment of a transformer apparatus according to aspects of the invention.

While FIG. 1 shows an embodiment of the transformer apparatus 10 and of the charging station 100, in which the switching logic 50 forms a combination circuit 52, in particular in a manual, for example also irreversible, manner, the embodiment in FIG. 2 is provided in a significantly more flexible manner. The switching logic 50 is designed here with a switching matrix 54. A monitoring unit 56 is simultaneously provided in order to provide, in particular, monitoring of the power consumption at the individual output connections 60. It is therefore also possible here to execute an embodiment, as FIG. 1 shows, in which the switching matrix 54 provides the same circuit that emulates the combinatorics of FIG. 1 and the embodiment illustrated there. However, also any desired other combinatorics of the individual secondary windings 40 is conceivable in a flexible manner in order to respond to different charging situations at the different charging points 110 in a flexible manner and, in particular, to change the provided charging power at the individual output connections 60 or to adapt them to the actual charging situation in a flexible manner.

Figure 3:
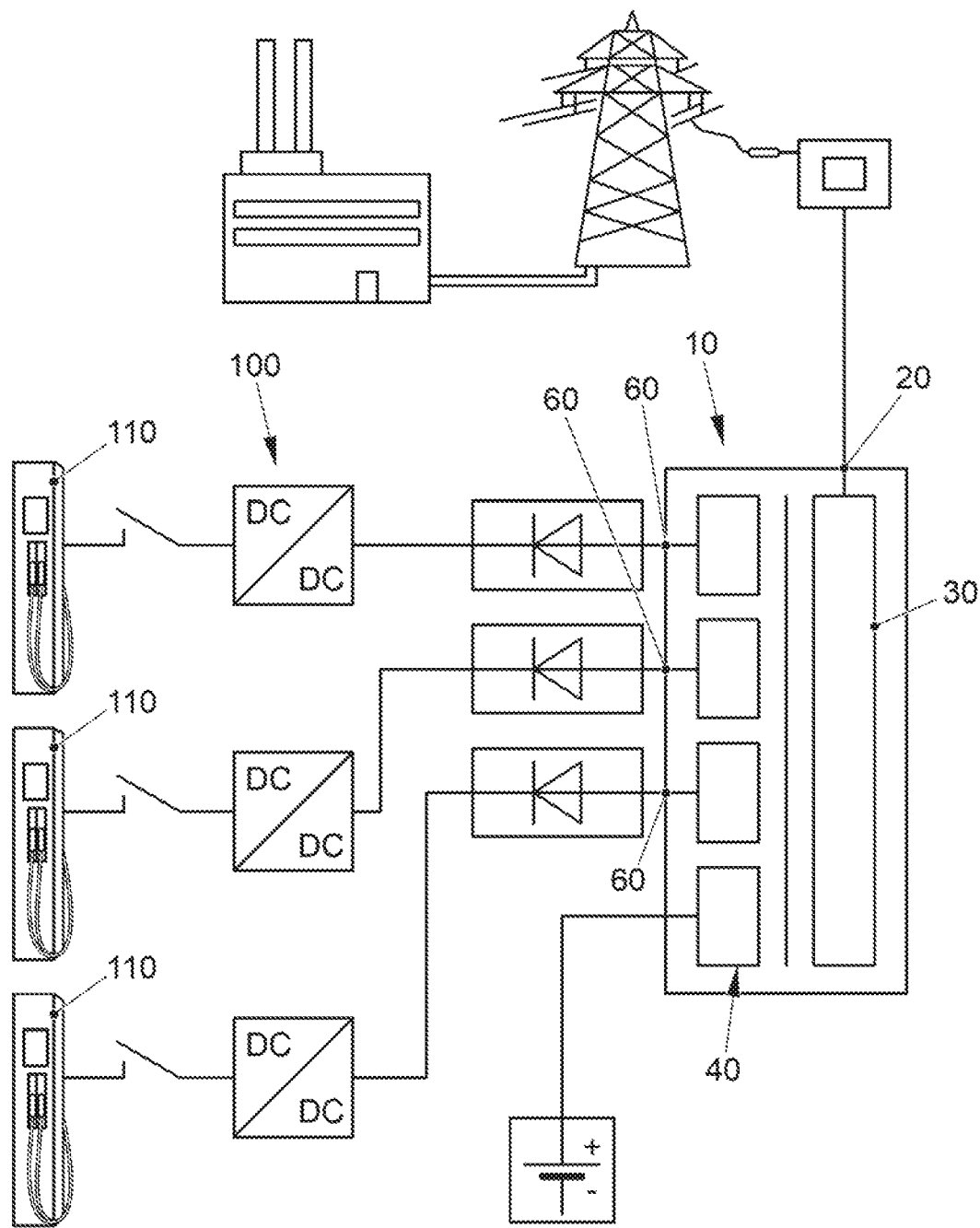
FIG. 3 shows a further embodiment of a transformer apparatus according to aspects of the invention that is integrated into the public energy grid.

FIG. 3 shows an option for incorporating a transformer apparatus 10 into the public energy grid by the input connection 20. By primary windings 30 and secondary windings 40, a charging option at various charging points 110 of the charging station 100 can be formed by the output connections 60.

The above explanation of the embodiments describes the present invention exclusively within the scope of examples. Of course, individual features of the embodiments, if technically expedient, can be freely combined with one another without departing from the scope of the present invention.

What is claimed is:

1. A transformer apparatus comprising:
   an input connection for electrical connection to an electrical power source;
   at least one primary winding; and
   at least three secondary windings that are DC-isolated from one another, each of the at least three secondary windings having an identical or similar individual output electric power,
   wherein:
   the secondary windings are configured to be connected to at least two output connections of at least two charging points by switching logic, and
   the switching logic connects at least two of the secondary windings electrically in parallel with a respective output connection of a respective charging point to vary a respective electrical power on the respective output connection of the respective charging point by combining the at least two of the secondary windings in parallel.

2. The transformer apparatus of claim 1, wherein the switching logic has at least one combination circuit, which combines the at least two of the secondary windings with one another onto the respective output connection.

3. The transformer apparatus of claim 2, wherein the combination circuit is configured as a reversible combination circuit.

4. The transformer apparatus of claim 1, wherein the switching logic has a switching matrix for flexible combination of the secondary windings onto the output connections.

5. The transformer apparatus of claim 4, wherein the switching matrix has a monitoring unit for monitoring the power consumption at the output connections and adapting the combination of the secondary windings based on the monitoring.

6. The transformer apparatus of claim 1, wherein the secondary windings are dimensioned for an identical or substantially identical power stage.

7. A charging station for electrically charging vehicles, comprising the at least two charging points and the transformer apparatus of claim 1.

8. The transformer apparatus of claim 1, wherein:
the switching logic connects the least two of the secondary windings electrically in parallel with the respective output connection of the respective charging point to vary the respective electrical power on the respective output connection of the respective charging point from the individual output electric power to at least double the individual output electric power.

9. The transformer apparatus of claim 1, wherein:
the switching logic connects at least three of the secondary windings electrically in parallel with the respective output connection of the respective charging point to increase the respective electrical power to a high charging power that is at least three times the individual output electric power.

10. A method comprising:
providing a transformer apparatus for electrically charging vehicles, the transformer apparatus including:
an input connection for electrical connection to an electrical power source,
at least one primary winding, and
at least three secondary windings that are DC-isolated from one another, each of the at least three secondary windings having an identical or similar individual output electric power,
wherein:
the secondary windings are configured to be connected to at least two output connections of at least two charging points by switching logic, and
the switching logic connects at least two of the secondary windings electrically in parallel with a respective output connection of a respective charging point to vary a respective electrical power on the respective output connection of the respective charging point by combining the at least two of the secondary windings in parallel; and
adapting the transformer apparatus to a charging station for electrically charging vehicles by connecting the at least two output connections of the at least two charging points electrically in parallel with at least two of the secondary windings by the switching logic.

11. The method of claim 10, further comprising:
monitoring power consumption at the at least two output connections by a monitoring unit; and
adapting a combination of the secondary windings based on the monitored power consumption.

12. The method of claim 10, wherein:
the switching logic connects the least two of the secondary windings electrically in parallel with the respective output connection of the respective charging point to vary the respective electrical power on the respective output connection of the respective charging point from the individual output electric power to at least double the individual output electric power.

13. The method of claim 10, wherein:
the switching logic connects at least three of the secondary windings electrically in parallel with the respective output connection of the respective charging point to increase the respective electrical power to a high charging power that is at least three times the individual output electric power.

* * * * *